(12) United States Patent
Cambon et al.

(10) Patent No.: US 10,377,183 B2
(45) Date of Patent: Aug. 13, 2019

(54) EVOLVING TREAD FOR A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Clermont-Ferrand (FR)

(72) Inventors: Stephanie Cambon, Clermont-Ferrand (FR); Damien Bardin, Clermont-Ferrand (FR); Jonathan Lejeune, Clermont-Ferrand (FR)

(73) Assignees: Compagnie Generale Des Etablissements Michelen, Clermont-Ferrand (FR); Michelin Recherche Et Tecnique, S.A., Granges-Paccot (CH)

( * ) Notice: Subject to any disclaimer, the term of this patent is extended or adjusted under 35 U.S.C. 154(b) by 378 days.

(21) Appl. No.: 15/100,839

(22) PCT Filed: Nov. 27, 2014

(86) PCT No.: PCT/EP2014/075838
§ 371 (c)(1),
(2) Date: Jun. 1, 2016

(87) PCT Pub. No.: WO2015/082310
PCT Pub. Date: Jun. 11, 2015

(65) Prior Publication Data
US 2016/0297252 A1    Oct. 13, 2016

(30) Foreign Application Priority Data
Dec. 2, 2013 (FR) ...................... 13 61934

(51) Int. Cl.
*B60C 11/03* (2006.01)
*B60C 11/12* (2006.01)

(52) U.S. Cl.
CPC ........ *B60C 11/0332* (2013.01); *B60C 11/033* (2013.01); *B60C 11/0323* (2013.01);
(Continued)

(58) Field of Classification Search
CPC . B60C 11/0332; B60C 11/033; B60C 11/032; B60C 11/0323; B60C 11/1281;
(Continued)

(56) References Cited

U.S. PATENT DOCUMENTS

| 2,322,505 A * | 6/1943 | Bull .................. B60C 11/04 152/209.21 |
| 4,462,446 A * | 7/1984 | Goergen ............... B60C 11/04 152/209.18 |

(Continued)

FOREIGN PATENT DOCUMENTS

| WO | 2011/039194 A1 | 4/2011 |
| WO | 2012/130735 A1 | 10/2012 |
| WO | 2013/066309 A1 | 5/2013 |

*Primary Examiner* — Eric Hug
(74) *Attorney, Agent, or Firm* — Dickinson Wright PLLC

(57) ABSTRACT

The tread includes over at least a first axial part (M) at least one wavy groove in a first direction and wavy grooves in a second direction. The wavy grooves in the second direction are connected to the wavy groove in the first direction. Over at least a second axial part (B) of the tread, at least one wavy groove continuous in a third direction, and wavy grooves continue in a fourth direction. The wavy grooves in the fourth direction are connected to the wavy groove in the third direction. When new, the open parts of the first axial part (M) are connected to one another, and the open parts of the second axial part (B) are not connected with one another. Beyond a part-wear condition, the open parts of the second axial part (B) are connected to one another, and the open parts of the first axial part (M) are not connected with one another.

7 Claims, 2 Drawing Sheets

(52) U.S. Cl.
CPC ........ *B60C 11/125* (2013.01); *B60C 11/1236*
(2013.01); *B60C 11/1281* (2013.01); *B60C*
*2011/0334* (2013.01); *B60C 2011/0353*
(2013.01); *B60C 2011/0365* (2013.01)

(58) Field of Classification Search
CPC ..... B60C 2011/0365; B60C 2011/0353; B60C
2011/0381; B60C 2011/0383; B60C 11/02
USPC ............... 152/209.17, 209.18, 209.26, 154.2
See application file for complete search history.

(56) References Cited

U.S. PATENT DOCUMENTS

| | | |
|---|---|---|
| 9,174,493 B2 | 11/2015 | Audigier et al. |
| 2008/0149237 A1* | 6/2008 | Cambron ............... B60C 1/0016 152/154.2 |
| 2011/0277898 A1* | 11/2011 | Barraud ............... B60C 11/0306 152/209.18 |
| 2012/0227883 A1* | 9/2012 | Audigier ............ B60C 11/0309 152/209.18 |
| 2013/0146191 A1* | 6/2013 | Audigier ............... B60C 11/047 152/209.21 |
| 2014/0261938 A1* | 9/2014 | Colby ..................... B29D 30/56 152/209.25 |
| 2014/0290814 A1* | 10/2014 | Audigier ............ B60C 11/0306 152/209.17 |
| 2016/0288579 A1* | 10/2016 | Marlier ............... B60C 11/0323 |

\* cited by examiner

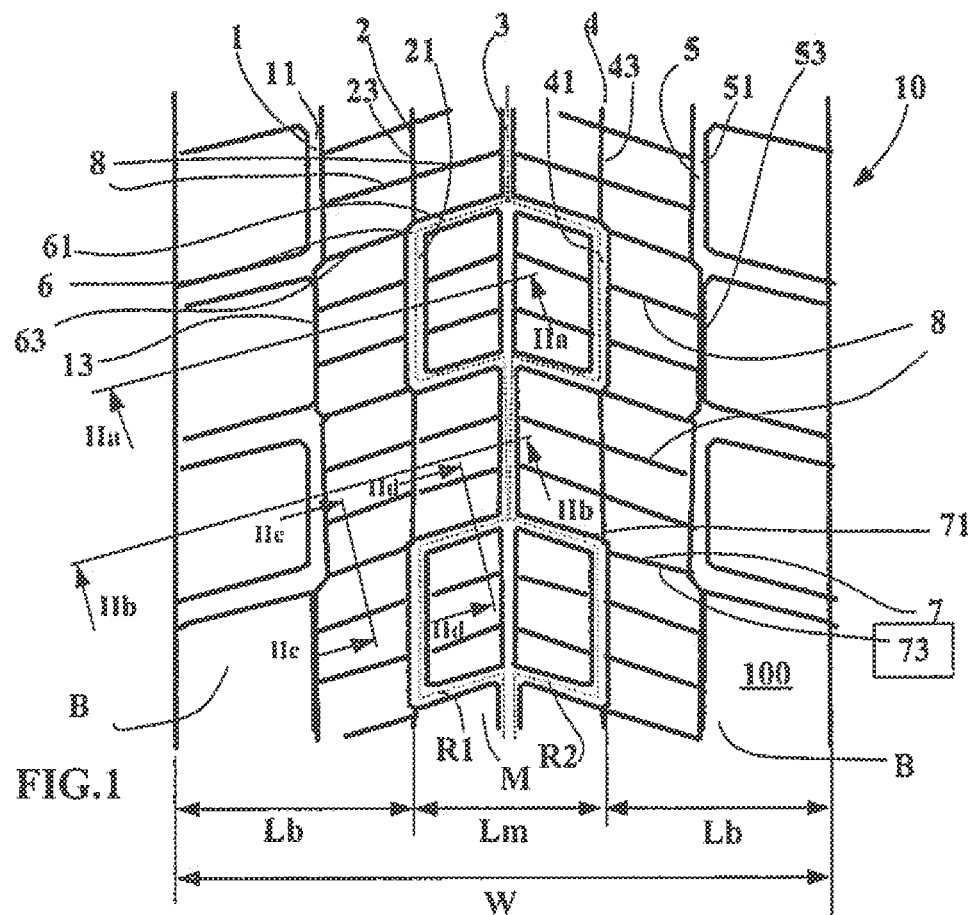
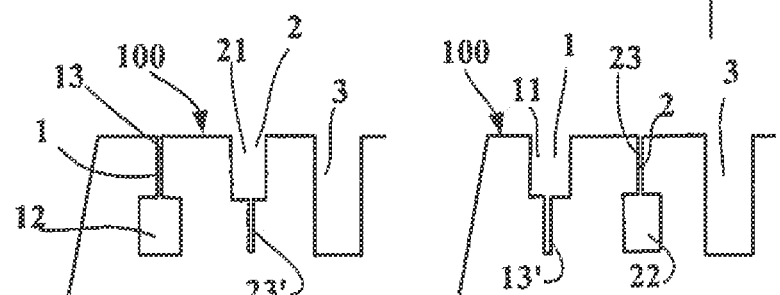
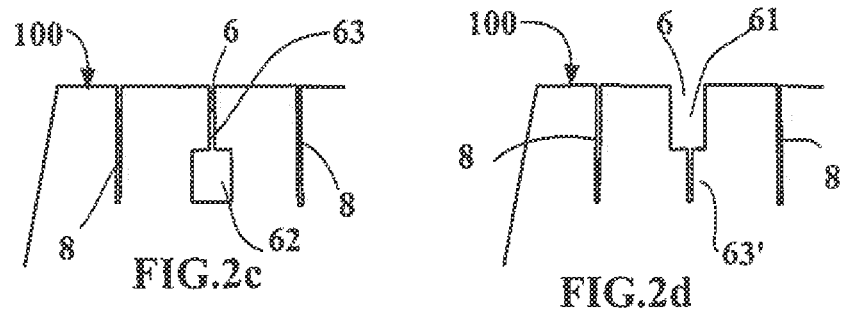

EVOLVING TREAD FOR A TIRE

This application is a 371 national phase entry of PCT/EP2014/075838, filed 27 Nov. 2014, which claims the benefit of French Patent Application No. 1361934, filed 2 Dec. 2013, the contents of which are incorporated herein by reference for all purposes.

BACKGROUND

The disclosure relates to treads for tires and more particularly to the designs of the tread pattern for these treads and to the tires provided with such treads which have a lasting ability to drain away standing water present on the roadway in times of wet weather, these treads having improved wear performance.

As is known, wet weather driving conditions require the most rapid possible elimination of the water from the contact patch in which each tire is in contact with the roadway so as to ensure that the tread makes contact with the roadway. Water that is not pushed over the front of the tire flows partially along the grooves and sipes formed in the tire tread, whether this be in the circumferential or transverse direction.

A cut refers generally either to a groove or to a sipe and corresponds to the space delimited by walls of material facing one another and distant from one another by a non-zero distance (referred to as the "width of the cut").

A groove here means a cut that opens onto a tread surface intended to be in contact with the roadway, this cut having a mean width such that the walls of material delimiting it are never in contact with one another under the normal service conditions of the tire. The grooves may have any shape when viewed in cross section and in terms of their path along the tread surface and may be oriented in any direction. The path of a groove along the tread surface here means the mean geometric line followed by the corners formed by the said groove on the said surface.

A sipe here, means a thin slit with a mean width that is small and such that, under certain loading conditions, the walls of material delimiting it may at least partially come into contact with one another when that sipe is in the contact patch.

In the present description, the terms radial or radially are used to indicate a direction which, when considered on the tire, is a direction perpendicular to the axis of rotation of the tire whereas, when considered on a tread alone, it corresponds to the direction of the thickness of the said tread. Moreover, the term circumferential is used to indicate a direction which corresponds to a direction tangential to any circle centered on the axis of rotation of the tire. This same direction corresponds to the longitudinal direction of the tread, the latter being formed in the manner of a flat strip before it is incorporated al the time of manufacture of a tire.

The disadvantage of creating a plurality of grooves in a tread is that it reduces the amount of tread material for a given width of tread and that it therefore reduces the service life of the tire on account of the increase in wear rate.

Moreover, the grooves reduce the compression and shear stiffnesses because these grooves delimit portions of material that are more sensitive to deformation by comparison with the portions delimited by sipes. Indeed in the case of sipes, the walls of material delimiting these sipes can come into contact with one another at least when the sipe is in the contact patch. This reduction in stiffness, in the case of the presence of grooves, leads to an increase in deformation and generates a reduction in wear performance of the tread: greater wear is observed for a fixed distance covered (this corresponding to an increase in the wear rate of the tread). Moreover, an increase in rolling resistance and therefore in the fuel consumption of vehicles fitted with such tires is observed, this being the result of an increase in hysteresis losses associated with the cycles of deformation of the material of which the tread is made.

Whatever the category of tire (namely whether is be a tire to be fitted to a passenger vehicle or a vehicle intended to carry heavy loads), the tread needs to have standing-water drainage performance that always remains above a minimum performance referred to as the safe performance. Accordingly, and given that the tread gradually wears away, progressively reducing the cross sections of the grooves, it is commonplace to produce grooves that open onto the tread surface when new and that extend into the thickness of the tread down to at least a level that corresponds to a limit that requires the tread to be withdrawn. This has the disadvantage of very appreciably reducing the stiffnesses of the said tread (both the compression stiffness and the shear stiffnesses).

The document published under number WO 2011/039194 has proposed forming in a tread grooves that have the particular feature of opening discontinuously onto the tread surface when new. This groove can be considered to be wavy in the thickness of the tread opening regularly onto the tread surface. This groove comprises a succession of open parts (open cavities), which means to say parts that open onto the tread surface when new, and of closed parts (closed cavities) which means to say ones that do not open directly onto this tread surface when new. These latter so-called closed parts are intended to form new grooves that open onto a tread surface when the tread has become part-worn, A wavy groove may be formed in the circumferential direction or in any other direction in a tread. As described in document WO 2011/039194, a wavy groove is continuous in the initial state (corresponding to the as-new condition of the tread after molding), this making it possible, when driving over a roadway covered with water, to ensure that water is picked up by the groove in the contact patch, the water thus picked up flowing along the wavy groove beneath the tread surface. That same document describes the possibility, after the manner of tread pattern designs of the prior art, to make connections between at least two wavy grooves.

SUMMARY

The present disclosure seeks to achieve a good-performance organization of this type of wavy groove in a tread for a tire of a heavy vehicle. Specifically, it is known that one of the performance aspects that is the subject of continuous development work is that of obtaining conditions that do not lead to uneven wear or at the very least that delay the onset of this kind of wear for as long as possible. Uneven wear in the present document means the appearance of more pronounced wear on an axial part of the tread. Conversely, even wear—that those skilled in the art seek to achieve—affects the entire width of the tread uniformly or substantially uniformly until the tire is withdrawn so that its tread can be replaced or so that a new tire can be fitted.

It is an object of the disclosure to propose a tread provided with grooves and sipes that makes it possible to have performance that is the equal of or superior to the minimum safety performance in terms of drainage, irrespective of the level of tread wear, while at the same time limiting uneven wear and reducing the void volumes to the bare minimum required.

To this end, one subject of the disclosure is a tread for a heavy vehicle tire of total thickness E and of width W, this tread having a tread surface intended to come into contact with a roadway during running, this tread comprising:

at least a first axial part comprising at least one wavy groove with waviness in the thickness of the tread and continuous in a first direction and a plurality of wavy grooves with waviness in the thickness of the tread and continuous in a second direction, each wavy groove comprising a plurality of open parts opening onto the tread surface when new and a plurality of closed parte beneath the tread surface, the closed parts being connected to the open parts and arranged in alternation (which means to say that an open part is flanked by two closed parts), each closed part being spaced away from the tread surface by a bridge of rubber, the wavy grooves in the second direction being connected to at least one wavy groove in the first direction.

at least a second axial part of the tread comprising at least one wavy groove with waviness in the thickness of the tread and continuous in a third direction and a plurality of wavy grooves with waviness in the thickness of the tread and continuous in a fourth direction, each wavy groove comprising a plurality of open parts opening onto the tread surface when new and a plurality of closed parts, the closed parts being connected to the open parts and arranged in alternation (which means to say that an open part is flanked by two closed parts), each closed part being spaced away from the tread surface when new by a bridge of rubber, the wavy grooves of this second axial tread part oriented in the fourth direction being connected to at least one wavy groove in the third direction.

This tread is such that:

when new, the open parts opening onto the tread surface of the first axial part are connected to one another to form a continuous surface network and such that the open parts opening onto the tread surface of the second part are disjointed from one another, and such that beyond a part-wear condition, the open parts opening onto a partly worn tread surface of the second axial part are connected to one another to form a continuous surface network and in that the open parts opening onto the partly worn tread surface of the first part are disjointed from one another.

A bridge of rubber corresponds to the part of the tread radially on the outside of each portion of the wavy grooves; this bridge of rubber may be continuous or cut with a sipe which it is known will close when it enters the contact patch.

The term "wavy groove" is interpreted in the present description as meaning a groove that zigzags (which means to say is made up of a series of segments) or even oscillates (in the manner of a sinusoid) between a first level corresponding to the tread surface when new and another level within the thickness of the tread. Waviness in a direction perpendicular to the direction of the thickness of the tread may also be superimposed on this waviness in the direction of the thickness of the tread.

Each cavity or groove that is continuous and wavy in the thickness of the tread has a mean cross section, it being possible for the surface area of this cross section to be constant or to vary about a mean value so as to ensure that fluid can flow along the said groove.

Grooves that are connected together means that the circulation of fluid inside a groove connected to another groove may interfere with the circulation of fluid inside the other groove.

By virtue of this tread structure, a void volume is obtained that is suited to achieving satisfactory drainage when new regardless of the level of wear while at the same time limiting the reduction in tread stiffness when new, this void volume being formed by the open parts (also referred to as external cavities) in an initial phase of use then by the closed parts (also referred to as internal cavities) in another phase of use, these internal and external cavities being connected to one another so as to allow liquid to circulate in each groove. By creating when new a first continuous network opening on to the tread surface, the drainage capability of the tread pattern is enhanced. By forming, in at least one other part of the tread, another network when the tread is part worn, more uniform wear is thus ensured, the loadings in the tread being distributed differently in the new state compared with the part worn state.

For preference, for certain types of tire according to the disclosure, it is advantageous for the tread to be such that the first axial part corresponds to the middle part of the tread and that the second axial part corresponds to those parts of the tread that are situated on each side of the middle part. This middle part extends about the equatorial mid plane over a width equal to at least 15% and at most 85% of the total width W of the tread.

In another preferred alternative form and for other types of tire according to the disclosure, the tread is such that the first zone is formed on each shoulder of the tire over a width equal to at least 15% and at most 85% of the total width W of the tread and, more advantageously still, between 30% and 65%.

In one alternative form of the disclosure, the tread further comprises a plurality of sipes opening onto the tread surface when new, each of the said sipes opening into two consecutive open parts of one and the same wavy groove and into one closed part of the same wavy groove, this closed part being situated between the said two open parts. This alternative form generates a high number of corners of material that are beneficial to achieving excellent traction performance.

In order to maintain a satisfactory level of stiffness of the tread according to the disclosure it is advantageous for the sipes extending the internal and external cavities to be provided with means of mechanically blocking the relative movements of the opposing walls that delimit the said sipes. Such means may take the form of waviness of the opposing walls or alternatively of reliefs molded onto the said walls and suited to collaborating with one another. Thus, in addition to the usual mechanism for closing the sipes when they enter the contact patch, it is possible to provide mechanical blockage of the walls delimiting the sipes.

The disclosure also relates to a tire provided with a tread defined in accordance with the disclosure, this tread surmounting radially on the outside a tire casing made up of a carcass reinforcement and of a crown reinforcement. The tread of this tire is produced as per one of the preceding alternative forms, certain dimensions of the grooves being connected with a mean length of the contact patch obtained under the service conditions of the tire.

It is advantageous for there to be, for each circumferentially oriented groove formed of parts that open onto the tread surface and of closed parts underlying the tread surface, at least one open part opening onto the tread surface that is always in the contact patch so as to allow good drainage. If the mean length of the contact patch under the nominal service conditions of the tire provided with a tread according to the disclosure is denoted T (this mean length being obtained by dividing the total surface area delimited by the external contour of this contact patch by the width W of the said patch) it is even more preferable still for the mean length of the open parts of the circumferential grooves when new to be comprised between 25% and 75% of the mean length T of the contact patch.

Further advantages and features of the disclosure will become apparent from the description given hereinafter with reference to the attached drawings which, by way of non-limiting examples, depict embodiments of the subject matter of the disclosure.

BRIEF DESCRIPTION OF THE FIGURES

FIG. 1 is a partial view of the tread surface of a tread of a tire when new according to the disclosure;

FIGS. 2a, 2b, 2c, 2d are cross sections taken on FIG. 1 on the planes of section identified by lines IIa-IIa, IIb-IIb, IIc-IIc, IId-IId respectively;

DETAILED DESCRIPTION

Figure 3:
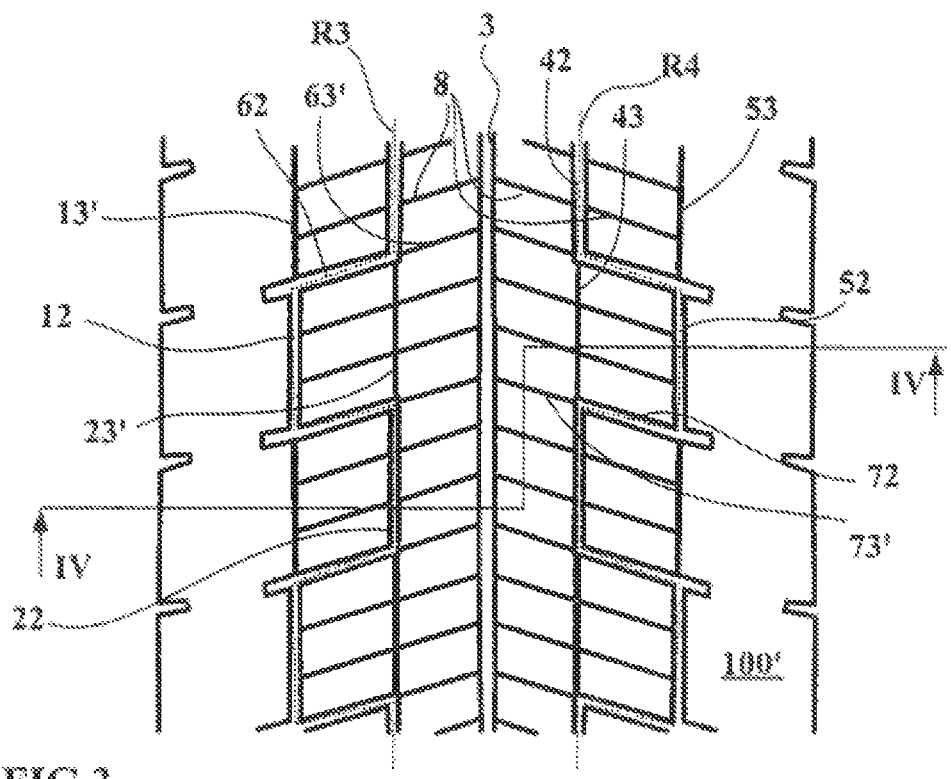
FIG. 3 is a view of the tread surface when the tread shown in FIG. 1 is part worn.

To make the figures easier to understand, identical reference signs are used to describe alternative forms of the disclosure where these reference signs refer to elements of the same kind, whether structurally or functionally.

FIG. 1 is a partial view of the tread surface of a tread of a tire as new according to the disclosure.

This FIG. 1 shows past of a tread 10 as new which is intended to equip a heavy vehicle tire of size 315/70R22.5.

This tread 10 has a tread surface 100 intended to come into contact with a roadway during running over a width W equal to 290 mm.

This tread is provided with five grooves 1, 2, 3, 4, 5 of circumferential overall orientation. A middle circumferential groove 3 is located on the mid plane of the tread; this middle groove 3 has a mean width equal to 6 mm. On each side of this middle groove 3 there are two wavy grooves 2, 4 with waviness in the thickness of the tread and continuous in the circumferential direction, these wavy grooves having the particular feature of opening intermittently onto the tread surface when new via open parts 21, 41 respectively. These groove parts opening onto the tread surface when new extend into the thickness of the tread via closed parts 22,42 respectively underlying the tread surface, so as to ensure continuity of circulation of fluid in each groove. These two wavy grooves 2, 4 between them axially delimit a middle part M of the tread; the length Lm of this middle part corresponds in this instance to 30% of the total width W of the tread.

Axially on the outside of the middle part M can be seen lateral parts B of width Lb equal in this instance to 35% of the total width W. In each lateral part B two wavy grooves 1, 5 with waviness in the thickness of the tread and continuous in the circumferential direction are molded. These wavy grooves 1, 5 have the particular feature of opening intermittently onto the tread surface when new via open parts 11, 51 respectively. The open parts 11, 51 of these wavy grooves 1, 5 of the lateral parts B are circumferentially offset in relation to the open parts 21, 41 of the wavy grooves 2, 4 delimiting the middle part.

Furthermore, it is possible to discern a plurality of oblique cuts on each side of the mid plane. These oblique cuts form a chevron pattern giving the design of the tread pattern a directionality. For preference, the oblique cuts make an angle other than zero and more preferably still, at least equal to 10 degrees, this angle being measured with respect to the axial or transverse direction. In this particular instance, the angle of these cuts is equal to 15 degrees with respect to the transverse direction.

These oblique cuts include wavy oblique grooves 6, 7 with waviness in the thickness of the tread. These wavy oblique grooves 6, 7 extend from the mid plane as far as the axially outermost circumferential wavy grooves 1, 5 and cross the intermediate wavy grooves 2, 4.

These oblique wavy grooves 6, 7 have a mean width equal to 6 mm and extend into the thickness of the tread over a total height equal to 13 mm. These oblique wavy grooves 6, 7 each comprise an open part 61, 71 opening onto the tread surface when new with a depth equal to 7 mm; each open part 61, 71 is extended into the thickness and beneath the tread surface of the tread when new by a closed part 62, 72 respectively, these closed parts having a height equal to 6 mm. The oblique wavy grooves 6, 7 are in phase with one another on each side of the mid plane.

As can be seen in FIG. 1, the connections established between the various circumferential wavy grooves 2, 4 and the oblique wavy grooves 6, 7 make it possible to create two open networks opening onto the tread surface when new, each of these networks having a zigzag geometry. In FIG. 1 these networks are marked with lines R1 and R2 drawn in dotted line.

In addition, it is possible to make out a plurality of sipes with the same orientation as the oblique wavy grooves. Between two oblique wavy grooves 6, 7 there are formed two sipes that open onto the tread surface when new and extend down to the depth of the circumferential groove 3 formed on the mid plane.

All the wavy grooves, whether they be circumferential or oblique, described in respect of this alternative form of the disclosure are extended—radially towards the outside of the closed parts lying beneath the tread surface—by sipes that open both into these closed parts and onto the tread surface when new. These sipes also extend as far as the open parts opening onto the tread surface when new.

As can be seen in FIG. 1, the open parts opening onto the tread surface when new of the middle part form with the middle circumferential groove a continuous surface network on the tread surface when new.

When new, this surface drainage network is supplemented, both on the middle part and on each lateral part, by a drainage network in the thickness of the tread thanks to the presence of the circumferential wavy grooves with waviness in the thickness.

FIGS. 2a, 2b, 2c, 2d show cross sections taken on FIG. 1 on planes of section of which the lines in FIG. 1 are identified by lines IIa-IIa, IIb-IIb, IIc-IIc, IId-IId respectively.

FIGS. 2a, 2b show the cross section of the wavy circumferential grooves when new. FIG. 2a shows the circumferential groove 3 formed on the mid plane and the circumferential wavy grooves 1 and 2. This figure shows the closed part 12 of the wavy groove 1 extended towards the tread surface by a sipe 13. The closed part 12 of the wavy groove 1 extends in the tread down to a depth equal to the depth of the middle groove 3. It is also possible to see the open part 21 opening onto the tread surface 100 of the wavy groove 2 which is extended inwards by a sipe 23'.

FIG. 2b shows the circumferential groove 3 formed on the mid plane and the circumferential wavy grooves 1 and 2. This FIG. shows the open part 11 of the wavy groove 1 opening onto the tread surface 100 when new, this open part 11 being extended inwards by a sipe 13'. It also shows the closed part 22 of the wavy groove 2 extended towards the tread surface by a sipe 23.

FIGS. 2c, 2d show cross sections of the oblique wavy grooves 6. What is depicted in the case of these oblique wavy grooves 6 also applies to the oblique wavy grooves 7 formed on the other side of the tread with respect to the mid plane.

FIG. 2c shows sipes 8 formed on each side of an oblique wavy groove 6 of which the closed part 62 extended radially towards the tread surface 100 when new by a sipe 63 may be seen.

FIG. 2d shows the open part 61 of the oblique wavy groove 6 extended radially towards the inside by a sipe 63'.

FIG. 3 shows a view of the tread surface 100' in a part-worn state corresponding in this instance to 55% of the total wearing thickness of the tread shown new in FIG. 1.

When part worn, the design of the tread pattern evolves and adopts a new geometry, the closed parts of the wavy grooves opening onto the tread surface to form open groove parts.

In order to maintain art effective corner length, the parts of the wavy grooves initially present on the tread when new are extended towards the inside by sipes, whatever wavy groove is being considered.

A continuous network of grooves is formed on each shoulder part, this network opening onto the tread surface 100' combines with the middle circumferential groove 3 to drain away standing water present on the roadway in wet weather. The said networks are depicted by lines R3 and R4 shown in dotted line.

The surface network R3 combines the initially closed parts 12, 22 underlying the tread surface when new of the circumferential wavy grooves 1 and 2 with the underlying closed parts 62 of the oblique wavy grooves 6.

The surface network R4 combines the initially closed parts 42, 52 underlying the tread surface when new of the circumferential wavy grooves 4 and 5 with the underlying closed parts 72 of the oblique wavy grooves 7.

Figure 4:
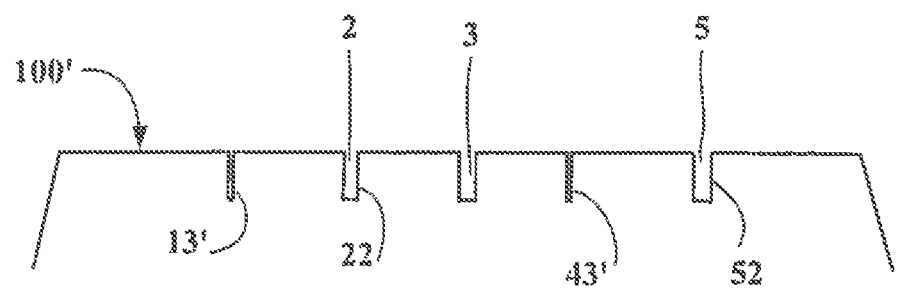
FIG. 4 is a view in section on a line IV-IV taken on the part-worn tread as shown in FIG. 3.

FIG. 4 is a cross section on a line IV-IV taken on the part-worn tread as shown in FIG. 3. Sipes 13', 43' and the initially closed parts 22 and 52 of the wavy grooves 2 and 5 respectively now open onto the partly worn tread surface 100'. The circumferential groove 3 remains in the middle part.

Thanks to this modification of the surface drainage networks, it is possible to limit the onset of uneven wear while at the same time still having suitable drainage throughout the service life of the tread according to the disclosure. By acting in this way, the tread according to the disclosure makes it possible to ensure even wear while at the same time tailoring the void volume of the various cuts more accurately so as to have the least possible effect on tread stiffness.

A tread according to the disclosure may be employed on a new tire or alternatively when a worn tire is retreaded.

In another alternative form not shown here, the provisions of FIG. 2 are applied to a new tread while the provisions of FIG. 1 correspond to the same tread when it has become part worn. What this means is that when new, the surface drainage network is present on the lateral parts of the tread like that which is depicted in FIG. 3 and evolves with wear to become situated in the middle part, like that which is shown in FIG. 1. In such a case, when new, the first axial part is formed on at least one of the parts axially furthest from the mid plane of the tread when new while the second axial part is formed on the middle part of the tread.

Advantageously, the level of part wear beyond which the change in network comes into effect is comprised between 10% and 85% of the wearing thickness of tread and, more advantageously still, between 30% and 65%.

That which has been shown and described in connection with two wear levels, namely a first level between the tread surface when new and the bottom of the groove parts that open onto the said tread surface and a second level that causes new groove parts to appear, may of course easily be generalized to the presence of more than two levels.

The disclosure is not restricted to the examples described and various modifications can be made thereto without departing from the scope as defined by the claims. In particular, the internal cavities or closed parts of different wavy grooves may be situated at different levels within the thickness of a tread.

The invention claimed is:

1. A tread for a heavy vehicle tire of width W, the tread having, when new, a new tread surface coming into contact with a roadway, comprising:

over at least a first axial part (M) of the tread a middle circumferential groove and at least one wavy groove with waviness in the thickness of the tread and continuous in a first direction and a plurality of wavy grooves with waviness in the thickness of the tread and continuous in a second direction, each of these continuous wavy grooves extending between a first level corresponding to the new tread surface and another level in the thickness of the tread, these wavy grooves comprising a plurality of open parts opening onto the new tread surface and a plurality of closed parts underlying the new tread surface, the closed parts being connected to the open parts and arranged in alternation, each closed part being spaced away from the new tread surface by a bridge of rubber, the wavy grooves in the second direction being connected to at least one wavy groove in the first direction;

over at least one second axial part (B) of the tread at least one wavy groove with waviness in the thickness of the tread and continuous in a third direction and a plurality of wavy grooves with waviness in the thickness of the tread and continuous in a fourth direction, each wavy groove comprising a plurality of open parts opening onto the new tread surface and a plurality of closed parts, the closed parts being connected to the open parts, these open and closed parts being arranged in alternation, each closed part being spaced away from the new tread surface by a bridge of rubber, the wavy grooves of this second axial tread part (B) oriented in the fourth direction being connected to at least one wavy groove in the third direction;

when the tread is new, the open parts opening onto the new tread surface of the first axial part (M) are all directly connected to one another by other open parts in the first axial part (M) that also open onto the new tread surface and by the middle circumferential groove to form a continuous surface network of grooves that extends circumferentially around the tire in the first axial part (M) and such that the open parts opening onto the new tread surface of the second axial part (B) are not all directly connected with one another by other open parts that open onto the new tread surface, and such that when the tread is in a partly worn condition, the open parts opening onto a partly worn tread surface of the second axial part (B) are connected to one another by other open parts that open onto the partly worn tread surface to form a continuous surface network of grooves that extends circumferentially around the tire in the second axial part (B) and such that the open parts opening onto the partly worn tread surface of the first axial part (M) are not all directly connected with one another by other open parts in the first axial part (M).

2. The tread according to claim 1, wherein the first axial part (M) is formed on the middle part of the tread when new and in that the second axial part corresponds to those parts of the tread that are situated on each side of the middle part.

3. The tread according to claim 2, wherein the width of the middle part (M) is comprised between 15% and 85% of the width W of the tread.

4. The tread according to claim 1, wherein, when new, the first axial art is formed on at least one of the parts axially furthest from the mid plane of the tread when new and in that the second axial part is formed on the middle part of the tread.

5. A tread for a heavy vehicle tire of width W, the tread having, when new, a new tread surface coming into contact with a roadway, comprising:
over at least a first axial part (M) of the tread a middle circumferential groove at least one wavy groove with waviness in the thickness of the tread and continuous in a first direction and a plurality of wavy grooves with waviness in the thickness of the tread and continuous in a second direction, each of these continuous wavy grooves extending between a first level corresponding to the new tread and another level in the thickness of the tread, these wavy grooves comprising a plurality of open parts opening onto the new tread surface and a plurality of closed parts underlying the new tread surface, the closed parts being connected to the open parts and arranged in alternation, each closed part being spaced away from the new tread surface by a bridge of rubber, the wavy grooves in the second direction being connected to at least one wavy groove in the first direction;
over at least one second axial part (B) of the tread at least one wavy groove with waviness in the thickness of the tread and continuous in a third direction and a plurality of wavy grooves with waviness in the thickness of the tread and continuous in a fourth direction, each wavy groove comprising a plurality of open parts opening onto the new tread surface and a plurality of closed parts, the closed parts being connected to the open parts, these open and closed parts being arranged in alternation, each closed part being spaced from the new tread surface by a bridge of rubber, the wavy grooves of this second axial tread part (B) oriented in the fourth direction being connected to at least one wavy groove in the third direction;
when the tread is new, the open parts opening onto the new tread surface of the first axial part (M) and the middle circumferential groove are connected to one another to form a continuous surface network and such that the open parts opening onto the new tread surface of the second axial part (B) are not connected with another, such that beyond a part wear condition, the open parts opening onto a partly worn tread surface of the second axial part (B) are connected to one another to form a continuous surface network and such that the open parts opening onto the partly worn tread surface of the first axial part (M) are not connected with one another, and wherein the at least one second part (B) comprises a plurality of sipes with the same orientation as a plurality of wavy oblique grooves, this orientation being at least equal to 10 degrees relative to an axial direction.

6. A heavy vehicle tire with width W, comprising:
a tread, the tread having, when new, a new tread surface coming into contact with a roadway, comprising;
over at least a first axial part (M) of the tread a middle circumferential groove at least one wavy groove with waviness in the thickness of the tread and continuous in a first direction and a plurality of wavy with waviness in the thickness of the tread and continuous in a second direction, each of these continuous wavy grooves extending between a first level corresponding to the tread surface when new and another level in the thickness of the tread, these wavy grooves comprising a plurality of open parts opening onto the new tread surface and a plurality of closed parts underlying the new tread surface, the closed parts being connected to the open parts and arranged in alternation, each closed part being spaced away from the new tread surface when new by a bridge of rubber, the wavy grooves in the second direction being connected to at least one wavy groove in the first direction;
over at least a second axial part (B) of the tread at least one wavy groove with waviness in the thickness of the tread and continuous in a third direction and a plurality of wavy grooves with waviness in the thickness of the tread and continuous in a fourth direction, each wavy groove comprising a plurality of open parts opening onto the new tread surface and a plurality of closed parts, the closed parts being connected to the open parts, these open and closed parts being arranged in alternation to each closed part being spaced away from the new tread surface by a bridge of rubber, the wavy grooves of this second axial tread part (B) oriented in the fourth direction being connected to at least one wavy groove in the third direction,
wherein:
when the tread is new, the open parts opening onto the new tread surface of the first axial part (M) are connected to one another via other open parts that also open onto the new tread surface and via the middle circumferential groove to form a continuous surface network and such that the open parts opening onto the tread surface of the second axial part (B) are not connected with one another by other open parts, and
such that beyond a part-wear condition, the open parts opening onto a partly worn tread surface of the second axial part (B) are connected to one another by other open parts that also open onto the new tread surface to form a continuous surface network and in that the open parts opening onto the partly worn tread surface of the first axial part (M) are not connected with one another by open parts in the first axial part (M),
the mean length of the open parts of the circumferential wavy grooves opening onto the new tread surface is comprised between 25% and 75% of the mean length T of the contact patch of the tire that is obtained under the service conditions of the tire.

7. The tread according to claim 2, wherein the width of the middle part (M) is comprised between 30% and 65% of the width W of the tread.

* * * * *